UNITED STATES PATENT OFFICE.

HECTOR DE GROUSILLIERS, OF BERLIN, GERMAN EMPIRE.

IMPROVEMENT IN THE MANUFACTURE OF ALKALINE CARBONATES.

Specification forming part of Letters Patent No. 143,755, dated October 21, 1873; application filed October 2, 1873.

*To all whom it may concern:*

Be it known that I, HECTOR DE GROUSILLIERS, of Berlin, in the German Empire, have invented a new process for the production of soda and potash from their respective haloid salts by the direct wet method; and do hereby declare that the following description forms a full and exact specification of the same, wherein I have set forth the nature and principles of my said invention, by which it may be distinguished from others of a similar class, together with such parts as I claim and desire to secure by Letters Patent—that is to say:

The carbonates of potash and soda are insoluble in alcohol, while chloride of ammonium and carbonate of ammonia are readily soluble, and the chlorides of potassium and sodium partially so. If, therefore, chloride of potassium or chloride of sodium are combined with monocarbonate of ammonia in an alcoholic solution, a transformation into alkaline carbonate and chloride of ammonium will take place, of which the former is precipitated, while the latter is retained in solution. The present invention consists in the utilization of the above facts, not heretofore known, for producing alkaline carbonates directly from the haloid salts by the following two methods:

According to the first method, chloride of sodium or chloride of potassium, together with a solution of monocarbonate of ammonia in alcohol or wood spirit, is introduced into a closed vessel, lined with lead, and capable of withstanding a pressure of about five atmospheres. The quantity of carbonate of ammonia must be rather in excess of that required for the proportion of equivalents, and the quantity of alcohol must be sufficient to hold in solution all the chloride of ammonium produced. The vessel being closed, the contents are heated by steam, either by means of an internal coil or by a steam-jacket. The heat is so regulated that the pressure produced thereby does not exceed five atmospheres. A gradual transformation of the haloid salt into alkaline carbonate will thus be effected. As soon as the transformation is completed, which can be ascertained by the decrease of pressure, and by withdrawing and testing samples, the liquid is drawn off and the remaining alkaline carbonate is washed with alcohol, in which a small quantity of carbonate of ammonia is dissolved, and it is then dried by application of a moderate heat, whereby the last traces of ammonia will be removed by evaporation. By this means soda or potash will be obtained free from water, and almost chemically pure.

From the hot alcoholic solution of chloride of ammonium withdrawn, as above described, the greater part of the chloride of ammonium will crystallize out on cooling; or the alcohol can be removed by distillation; and, according to a well-known method, the chloride of ammonium is then mixed with one equivalent of chalk and heated in cast-iron retorts, whereby it is converted into chloride of calcium, (which remains in the retort,) and into sesquicarbonate of ammonia and caustic ammonia, which are mixed with the alcohol required for the next operation, where they combine to form monocarbonate of ammonia, which remains in solution.

The before-described process may, by these means, be carried on continuously, and with a very small loss of ammonia and alcohol.

For manufacturing on a large scale, it is preferred to employ the following modified process: The haloid salts are filled into a closed vessel, lined with lead, and provided with a double perforated bottom, and a hot solution of monocarbonate of ammonia, in spirit of high strength, is then forced through the salt until a sample taken from the solution issuing from the vessel shows that no more chloride of ammonium is contained in such solution. The entire contents of the vessel will then be found to have been converted into alkaline carbonate, which only requires to be dried. This process may be readily employed for the continuous production of soda and potash on a large scale, and all losses are thereby reduced to a minimum.

The above-described processes may also be carried out without the application of heat, in which case the vessels need not be closed hermetically; also, the chlorides of sodium or potassium can either be first dissolved in water with carbonate of ammonia, and the alcohol be then added, or vice versa.

In the first case, the alkaline carbonates will be precipitated as soon as, by the addition of the spirit, this is contained in sufficient proportion in the solution. In the latter case—that is, when the spirit is first added—the precipitation will be effected at once; but, in this case, such a quantity of spirit must be employed that it is not diluted too much, by the addition of the solution, so as to prevent further precipitation.

According to the heat employed, as also by use of an excess of carbonic acid, alkaline carbonates, with a higher percentage of carbonic acid, may be produced. Other alkaline salts besides the chlorides of potassium and sodium may, in alcoholic solution, be converted into alkaline carbonates, by means of carbonic acid, according to the above-described process, partly without the use of ammonia (as, for instance, sulphide of sodium, sulphuret of potassium, and acetate of potash) and partly with the addition of ammonia, which combines with the acid of the alkaline salt.

I do not, however, claim the use of such other alkaline salts as a part of the present invention.

Having thus described the nature of my invention, and in what manner the same is to be performed, I claim—

The process for the production of alkaline carbonates from their haloid salts, by treating the latter with carbonate of ammonia dissolved in strong alcohol or wood spirit, substantially as hereinbefore described.

In testimony whereof I have signed my name to this specification in the presence of two subscribing witnesses this 8th day of September, 1873.

HECTOR DE GROUSILLIERS.

Witnesses:
HANSOON ADELSON, *of Berlin*.
ZULIM VENMANN, *of Berlin*.